Sept. 1, 1964   O. J. H. WULFERT ETAL   3,147,050
BEARING MOUNTING FOR ROTATING MACHINES
Filed May 22, 1962
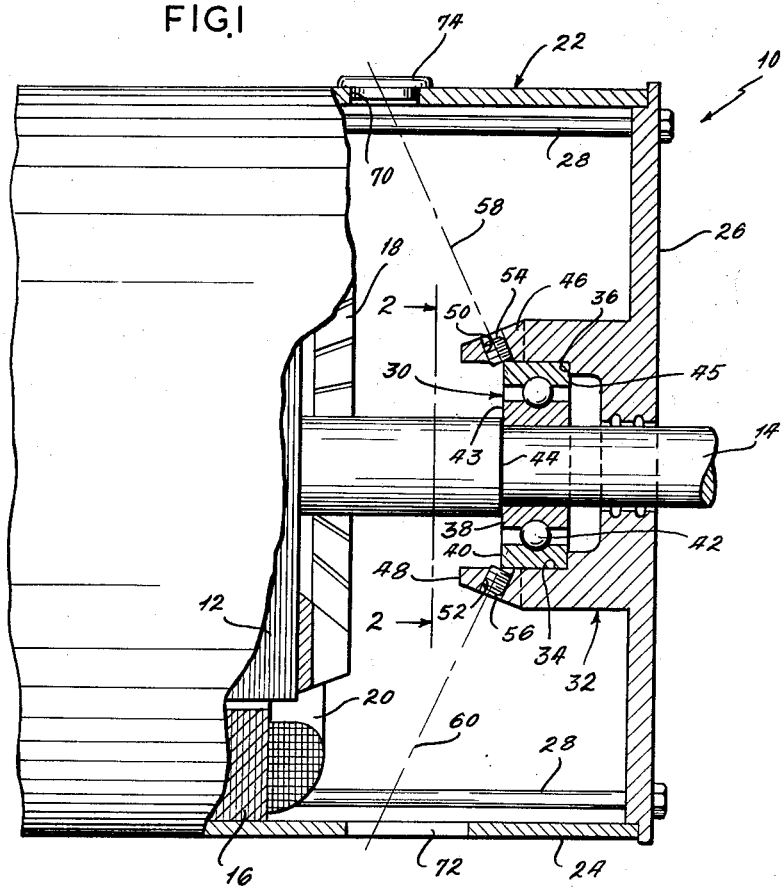
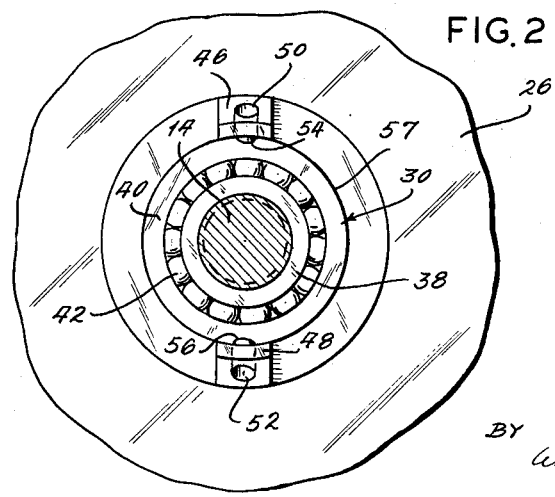
INVENTORS.
OTTO J.H. WULFERT
WILLIAM J. ZOLLMANN, JR.
BY
William K. O'Meara
AGENT

United States Patent Office

3,147,050
Patented Sept. 1, 1964

3,147,050
BEARING MOUNTING FOR ROTATING
MACHINES
Otto J. H. Wulfert, University City, and William J. Zollmann, Jr., Foristell, Mo., assignors to Wagner Electric Corporation, St. Louis, Mo., a corporation of Delaware
Filed May 22, 1962, Ser. No. 196,642
3 Claims. (Cl. 308—236)

This invention relates to bearing mounting means for a rotating machine and more particularly to improved bearing mounting means for holding a bearing in its bearing seat.

In the past, in order to avoid undesirable shaft end play in a rotating machine, such as a dynamo-electric machine, the shaft bearing was usually held against its seat in the end bell or end shield of the machine by means of a bearing clamping plate or washer inside the machine and screws which were inserted through the end bell and into tapped holes in the clamping plate from outside the machine for clamping the plate against the inner side of the bearing. This was a rather tedious and expensive arrangement because of the difficulty in aligning the externally inserted screws with the tapped holes in the clamping plate. Various other bearing holding devices, such as pivotal latch members and L-shaped members which were swung over the inner side of the bearing and tightened from the outside of the machine have been proposed. These devices, however, were often relatively complicated and expensive or did not provide positive means for positioning the member over the inner side of the bearing.

It is therefore an object of the present invention to provide improved means for mounting a bearing in a rotating machine wherein the abovementioned disadvantages are avoided.

Another object is to provide improved means for mounting a bearing in a rotating machine which greatly simplifies assembly of the parts.

Another object is to provide an improved machine housing and bearing mounting including simple and efficient means for locking a bearing in its bearing seat of the machine.

Another object is to provide a simplified method of securing a shaft bearing in its bearing seat.

A further object is to provide a new and improved housing and bearing assembly for a rotating machine wherein the bearing can be accurately and easily locked in proper position.

Still another object is to provide an improved motor housing including an end shield adapted to receive a ball bearing for rotatably supporting the motor shaft, and whereby the bearing can be quickly and easily locked in proper position.

Briefly, in accordance with one embodiment of the present invention, a housing for a rotating machine is provided with a bearing receiving hub having a portion thereof extending inwardly beyond the inner side of the bearing, bearing holding means are disposed in the extending portion of the hub for engaging the bearing, and the housing is provided with an opening to permit access to the bearing holding means for moving the same into engagement with the bearing to secure the bearing in the hub.

These and other objects and advantages of the present invention will become apparent from the following detailed description and accompanying drawings wherein:

FIG. 1 is a side view, partly broken and partly in section, of one end of a motor embodying the present invention, and FIG. 2 is a fragmentary view taken along line 2—2 of FIG. 1.

Referring now to FIGS. 1 and 2 of the drawing, there is shown for illustration an electric motor indicated generally at 10. Motor 10 is provided with a rotor member 12 fixed to a shaft 14 and aadpted for rotation within a stator member 16. The rotor 12 is shown as being of the conventional laminated squirrel-cage type which has connected thereto a ventilation fan 18. The stator member 16 is provided with suitable stator windings 20 disposed in slots in the core of the stator. The rotor 12 and stator 16 are disposed within a motor housing, indicated generally at 22, which includes a frame 24 and an end bell or shield 26 engaging one end of the frame. Another end shield (not shown) may be used which engages the other end of frame 24, and the two end shields may be secured to the frame by means of through-bolts 28 which clamp them against the opposite ends of the frame. The rotor 12 is supported for rotation in end shield 26 by a bearing, shown as a ball bearing 30, mounted in a hub 32 of the end shield.

The hub 32 is shown integral with end shield 26 and has an internal annular recesse 34 and an inwardly facing shoulder 36 serving as a bearing seat for the bearing. Bearing 30 includes an inner race 38 and an outer race 40 separated by bearing balls 42. The bearing 30, as viewed in FIG. 1, has an inner or left-hand side 43 facing inwardly of the motor or toward the rotor 12, and an outer or right-hand side 45 facing outwardly of the motor or toward the end shield 26. The inner race 38 is disposed in tightly fitting relation on shaft 14 with the inner or left-hand side of the inner race adjacent to or seated against an outwardly facing shoulder 44 on the shaft; and the outer race 40 is disposed in the recess 34 with its outer or right-hand side seated against shoulder 36 of the hub.

The hub 32 extends axially inwardly past the inner side 43 of the bearing, the hub being shown in the drawing with integral end portions 46 and 48 which extend axially inwardly of the motor beyond the inner side of the bearing. If desired, the hub may be formed such that portions 46 and 48 are portions of an integral continuous annular end portion of the hub. Tapped holes 50 and 52 are formed in hub portions 46 and 48, respectively, for receiving bearing locking elements 54 and 56, respectively. The elements 54 and 56 are shown as setscrews which are threaded into the tapped holes to engage bearing 30 at the axially inner, radially outer, peripheral edge 57 of the outer race 40 to lock the bearing in its bearing seat. The screws 54 and 56 are diametrically spaced on opposite sides of the shaft.

The tapped holes 50 and 52 are inclined relative to the axis of shaft 14 and are formed in the hub such that each extends radially inwardly and axially outwardly toward the bearing. The axis of the hole 50 and screw 54 is indicated by a dashed line 58, and the axis of hole 52 and screw 56 is indicated by a dashed line 60. As seen in FIG. 1, the axes 58 and 60 are each disposed at an angle of about 68° from the axis of shaft 14. Since each of the setscrews extend radially inwardly and axially outwardly in a direction toward the bearing, they urge or move the outer race 40 toward the shoulder 36 when turned into engagement with the bearing.

To provide access to the setscrews 54 and 56 for turning them and locking the bearing 30 in the hub after the end shield 26 is assembled to the frame, as will be described in detail hereinafter, access openings 70 and 72 are formed in the housing 22. In the construction shown in the drawing, the openings 70 and 72 are respectively located in the frame 24 of the housing in aligned relation with the screws 54 and 56, that is, the openings are disposed such that the axes 58 and 60, respectively, pass through them as indicated in FIG. 1. A suitable tool (not shown) such as a conventional screwdriver or setscrew wrench, can be inserted through openings 70 and 72 from outside the motor for turning the screws 54 and 56 after the end shield 26 is secured to the frame.

The opening 70 at the top of the motor is closed by a suitable closure 74 to prevent foreign matter from entering the motor through the opening. The closure 74 is shown as a removable cap or plug which may be formed from sheet metal, plastic or other material and formed so that it will grippingly fit in the opening. Opening 72 at the bottom of the frame may serve as a ventilation opening for the motor. Depending on the design, both of the access openings may be closed or may be used as ventilation openings.

In assembling the end shield 26 and the bearing 30, the bearing is pressed on shaft 14 and, with the setscrews only partially threaded in their respective tapped holes or before they are inserted therein, the end shield is placed against the end of frame 24 with the bearing sliding into the hub, and the through-bolts 28 are then tightened to secure the end shield in place.

In the case where screws 54 and 56 are partially threaded into the tapped holes before the end shield is assembled, the tool for turning the screws is simply inserted from outside the motor through the openings 70 and 72 and the screws turned until they engage and lock the bearing within the hub. If desired, the setscrews may be inserted from the outside after the end shield has been assembled by employing a tool which will hold the screws, such as a wrench having a magnetized tip and, in such case, the tool and screw are inserted through each of the openings in the frame and the screw turned into engagement with the bearing to lock it in place. The setscrews may be prevented from subsequently loosening or turning in their holes by any suitable means. For example, before the setscrews are inserted into their threaded holes, they may be dipped in a suitable cement, paint or other agent which subsequently hardens to prevent them from turning. If the setscrews are made long enough, lock nuts or the like may be placed on their free ends if desired. After the setscrew 54 has been properly tightened, the closure 74 may be inserted in the opening 70.

After the setscrews, which are peripherally 180° apart, have been properly tightened, the bearing is firmly locked in position in its bearing seat in the end shield and undesirable shaft end play is avoided. Thus the present invention provides simple and positive means for securing a bearing in a bearing seat of a rotating machine which greatly simplifies the assembly of the parts and provides a quick and easy method of assembling and locking the bearing in position.

It is to be understood that the foregoing description and drawing have been given only by way of illustration and example and that the present invention is limited only by the claims which follow.

What we claim is:

1. A dynamo-electric machine comprising a stator member, a rotor member, a shaft secured to said rotor member, a housing substantially enclosing said stator and rotor members and including a frame portion and an end shield portion at one end of said frame portion, said end shield portion having opposed interior and exterior sides and a bearing recess in said interior side, shoulder means in said recess, a ball bearing in said recess having radially inner and outer races with ball bearings therebetween, said inner race receiving said shaft and being rotatable therewith, said outer race having axially inner and outer opposed sides with said outer side adjacent said shoulder means, said recess having a wall portion extending axially inwardly past said axially inner side of said outer race, said wall portion having a threaded hole therethrough, said hole having an axis disposed at an acute angle with the axis of said shaft and inclined axially outwardly to intersect said outer race, and threaded bearing locking means in said hole, said locking means having an end surface engageable with said outer race, said housing having an opening therethrough for the insertion of a tool into said housing from the outside thereof for turning said locking means to lock said bearing in said recess against said shoulder means.

2. A dynamo-electric machine comprising a stator member, a rotor member, a shaft secured to said rotor member, a housing substantially enclosing said stator and rotor members, said housing including a frame and an end shield connected to one end of said frame, said end shield having opposed interior and exterior sides and including a hub on said interior side, said hub having an annular bearing recess and an annular shoulder in said recess defining a bearing seat, a ball bearing in said bearing seat having radially inner and outer races with ball bearings therebetween, said inner race receiving said shaft and being rotatable therewith, said outer race having axially inner and outer opposed sides with said outer side adjacent said shoulder means, said hub having wall portions extending axially inwardly beyond said axially inner side of said outer race, said wall portions having threaded holes therethrough, each of said holes having an axis disposed at an acute angle with the axis of said shaft and inclined axially outwardly to intersect said outer race, and threaded bearing locking means in each of said holes, each of said locking means having an end surface engagable with said outer race, said housing having openings therethrough for the insertion of a tool into said housing from the outside thereof for turning said locking means to lock said bearing in said recess against said shoulder means.

3. An electric motor comprising a stator member, a rotor member, a rotatable shaft secured to said rotor member, a housing substantially enclosing said stator and rotor members including a frame and an end shield secured to one end of said frame for rotatably supporting said shaft, said end shield having interior and exterior sides, a centrally located hub integrally formed on said interior side, an annular recess in said hub having an inwardly facing annular shoulder forming a bearing seat, a ball bearing in said bearing seat having radially inner and outer races with ball bearings therebetween, said inner race secured to said shaft and rotatable therewith, said outer race having an outer peripheral surface and inner and outer opposed sides intersecting said peripheral surface respectively at axially spaced inner and outer edges of said outer race, said hub having portions thereof extending inwardly beyond said inner edge of said outer race, said hub portions having threaded holes therethrough, said holes being peripherally spaced and each having an axis disposed at an acute angle with the axis of said shaft and inclined radially inwardly and axially outwardly to intersect said inner edge, and a threaded set screw in each of said holes, each of said screws having an end surface engagable with said inner edge, said housing having openings therethrough in aligned relation with said screws, respectively, for the insertion of a tool into said housing from the outside thereof for tightening said screws against said inner edge to urge said outer race axially outwardly against said shoulder to lock said outer race in said bearing seat.

References Cited in the file of this patent

UNITED STATES PATENTS

| | | |
|---|---|---|
| 1,187,271 | Davey | June 13, 1916 |
| 1,940,455 | Kilpela | Dec. 19, 1933 |
| 2,345,952 | Smith | Apr. 4, 1944 |
| 2,511,675 | Monpain | June 13, 1950 |
| 2,640,168 | Agule | May 26, 1953 |
| 2,649,337 | Ware | Aug. 18, 1953 |
| 2,891,829 | Irvin | June 23, 1959 |
| 3,026,156 | Straus | Mar. 20, 1962 |